April 19, 1932. E. J. VAN SICKEL 1,854,495
LOCK HOUSING ASSEMBLY
Filed March 28, 1930
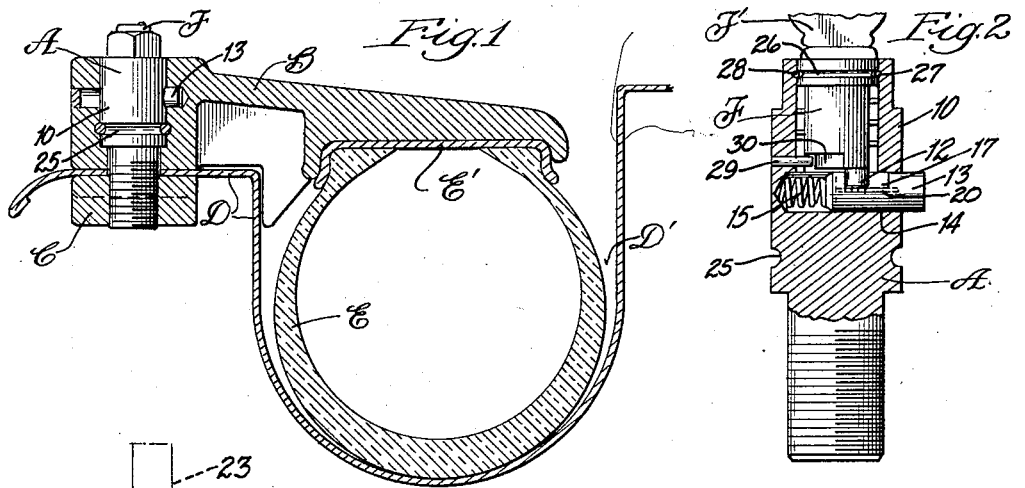
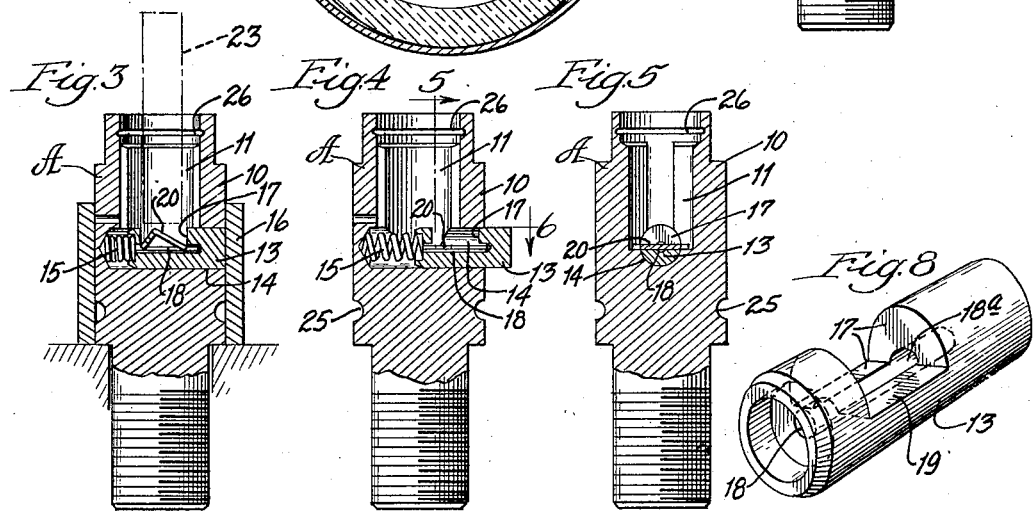
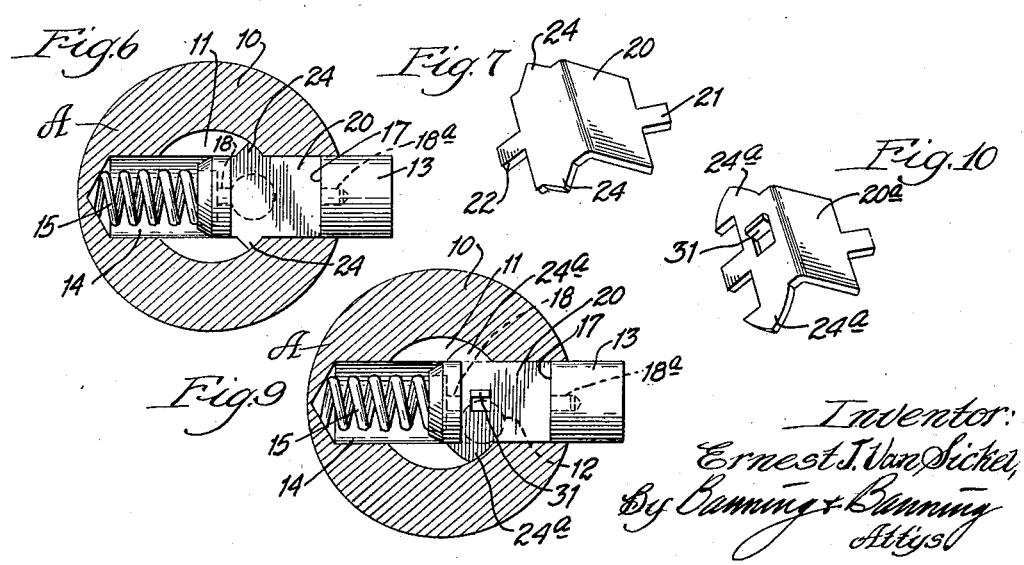
Inventor:
Ernest J. Van Sickel,
By Banning & Banning
Attys Patented Apr. 19, 1932

1,854,495

UNITED STATES PATENT OFFICE

ERNEST J. VAN SICKEL, OF WAUKEGAN, ILLINOIS, ASSIGNOR TO OAKES PRODUCTS CORPORATION, OF NORTH CHICAGO, ILLINOIS, A CORPORATION OF MICHIGAN

LOCK HOUSING ASSEMBLY

Application filed March 28, 1930. Serial No. 439,590.

It has been a common practice for automobile manufacturers in many instances to buy various key-controlled mechanisms, such as, ignition switch, door lock, spare wheel lock, and the like, from various sources with the result that the locks supplied with these parts, when installed on a car, would require the use of several different keys for their operation; or to issue specifications to the makers of such equipment regarding key formations for locks to be individually marked so that eventually each lock might be matched with others in the same set, thereby permitting a single key to be used for all locks which are installed on a single car.

Various plans have been resorted to in the effort to utilize in each car a number of lock cylinders, all substantial duplicates of each other, made by the same manufacturer, and operable by a single key. There have been certain practical difficulties in connection with this, however, owing to the fact that these parts could not be completely assembled until they reached the automobile manufacturer, and in the completed car to which they were to be assigned.

An object of this invention is to provide an assembly of a housing for a lock cylinder which is self-contained, and which is capable of endless modification in the various uses to which lock housings may be put, so that the housing may be mounted complete, as in an automobile or the like, so that the lock cylinders may be later supplied and inserted in the various assembled housings of the now practically completed automobile.

These and other objects, as will hereinafter appear, are accomplished by this invention which is fully described in the following specification, and shown in the accompanying drawings, in which—

Figure 1 is a vertical sectional view of a lock bolt associated with a lock bar for securing a spare tire in a fender well, Fig. 2 is an enlarged broken vertical sectional view of a lock bolt with a lock cylinder assembled therein;

Fig. 3 is a vertical sectional view similar to Fig. 2 showing the lock bolt seated on an anvil and having a collar surrounding the lock bolt for retaining the plunger while the retainer is being assembled;

Fig. 4 is a view similar to Fig. 3 after the retainer is assembled in the plunger;

Fig. 5 is a transverse section on the line 5 of Fig. 4;

Fig. 6 is an enlarged horizontal section on the line 6 of Fig. 4;

Fig. 7 is an enlarged perspective view of the retainer before being assembled in the plunger;

Fig. 8 is a greatly enlarged perspective view of the plunger;

Fig. 9 is a view similar to Fig. 6 showing a modified form of retainer in assembled position; and Fig. 10 is a perspective view of the retainer shown in Fig. 9 before being assembled in the plunger.

While the embodiment illustrated is shown in connection with a lock for spare wheels, it will be understood that this is illustrative only, and that the lock housing assembly herein described is capable of application with only slight modification to all the lock housings for use in the various parts of an automobile elsewhere.

Referring now to the drawings, the lock housing A is a lock screw having a cylindrical upper portion 10 passing through a shouldered opening in a locking arm B, while the screw threads engage a nut C which is secured to to an automobile fender D, having a fender well D' in which is located a tire E on a rim E', the rim being retained therein by means of the locking arm B and the lock bolt A, as will hereinafter be more fully described.

The lock bolt A is provided with a bore 11 in the upper portion which is adapted to receive a lock cylinder F of any well known type, which is operated by means of a key F', and which carries at its lower end an eccentric finger 12, which is adapted to retract a locking bolt or plunger 13 which is slidably fitted into a transverse opening 14 in the locking bolt A, and which is optionally urged outwardly by means of a compression spring 15.

As earlier stated, an object of this invention is to provide a means for assembling the lock bolt or plunger 13 in the lock cylinder housing A in such a way that this lock cylinder housing may be sent out as a unit, and as such may be assembled in the automobile or other similar mechanism, after which the lock cylinder F may be assembled. To do this the plunger 13, together with its actuating spring 15, is placed in the lock cylinder housing 10 after which a sleeve 16 is temporarily placed thereover so as to hold the plunger 13 in retracted position, as shown in Fig. 3.

Referring now to Fig. 8, the plunger 13 is provided with a transverse slot 17 and a longitudinal hole 18, the slot 17 taking somewhat more than half the diameter of the plunger and providing a flat seat 19, upon which the retainer 20 of Fig. 2 is adapted to lie. This retainer is made in angle form, as shown in Fig. 7, in order to permit it to be assembled. The method of assembling is shown in Figs. 3 and 4.

The retainer 20 is provided at each end with tongues 21 and 22 which are adapted to pass into the openings 18$^a$ and 18 respectively of the plunger 13. In Fig. 3 the tongue 21 is shown in the opening 18$^a$, while the tongue 22 is just ready to enter the opening 18 at the opposite end. The center portion of the retainer 20 is arched to permit the tongue 22 to enter the opening 18, after which a bar 23 is inserted through the top of the housing 10, as shown in dotted lines in Fig. 3. This is pressed down on the top of the retainer 20 and struck a sharp blow with a hammer (not shown) so as to flatten out the retainer 20, as shown in Fig. 4, thereby forcing the tongue 22 into the opening 18, thereby permanently locking the retainer 20 to the plunger 13. The main body of the retainer 20 is of the same width as the flat seat 19, and has two outwardly extending ears 24 which, as shown in Fig. 6, engage the cylindrical inner surface of the housing 10 and prevent the plunger 13 from moving outwardly beyond the position shown.

Thus it will be seen that the plunger 13 is now a unitary structure which is self-locking, so that the combination of the housing 10 and the plunger 13 is a unit and as such may be assembled in the spare tire lock assembly of Fig. 1, and the lock cylinder 15 omitted. In the same way a modification of the housing 10, which will be apparent to anyone skilled in this art, may be used as a door lock, and another as a compartment lock, ignition lock, transmission lock, or the like, and each of these may be made by a separate manufacturer, if desired, and all brought in and assembled in a car by the automobile manufacturer. With these all assembled, except for the lock cylinder, the car manufacturer may now insert a set of lock cylinders in a single car, all of which are substantial duplicates, and all of which may be operated by the same key.

It will be apparent that a great deal of lost motion is thus avoided, such as would be occasioned where the car manufacturer were to send out a series of say, four lock assemblies to four separate parts manufacturers. When these parts came back with the locks assembled therein it would then be necessary to pick out these parts having duplicate locks out of the parts thus received in order to assemble in a single car locks which are duplicates. All this is avoided by the present invention.

The lock housing A is provided with an annular groove 25 which serves to lock it permanently to the locking arm B. This may be done either by means of a pin driven through a corresponding hole in the locking arm B, or by means of an expanding snap ring which is adapted to snap outwardly into a corresponding annular groove in the arm B. Likewise the lock cylinder F is provided with a duplicate annular groove 26 into which fits a snap ring 27, which is adapted to snap outwardly into a corresponding annular groove 28 in the lock housing A. Thus to complete the installation, the car manufacturer forces the lock cylinder F down until the snap ring 27 snaps outwardly into the groove 28, thereby locking the two together after which they cannot be disassembled without considerable injury to the parts.

The rotation of the lock cylinder F in the housing A is limited by means of a pin 29 operating in a slot 30 in the end of the lock cylinder. This limitation of the rotation of the lock cylinder is otherwise provided for in Figs. 9 and 10, in which the retainer 20$^a$ has in addition to the features of the retainer 20 a pressed up lug 31 which serves as a limiting stop for the eccentric finger 12, which is shown in dotted line position in Fig. 9. In order that it may act also as a stop at the inner swing of the plunger 13, the ears 24$^a$ are made somewhat wider and slightly overhang the sides of the plunger 13 as there shown.

While I have shown and described but a few embodiments of my invention, it is to be understood that it is capable of many modifications. Changes, therefore, in the construction and arrangement may be made which do not depart from the spirit and scope of the invention as covered by the appended claims.

I claim:

1. In a lock mechanism, a lock cylinder housing having a bore adapted to receive a lock cylinder, a plunger movable transversely in said housing by said lock cylinder, and means carried solely by said plunger and insertable therein after the plunger is assembled in said housing for retaining the plunger assembled in said housing.

2. In a lock mechanism, a lock cylinder housing having a bore adapted to receive a lock cylinder, a plunger movable transversely in said housing by said lock cylinder, said plunger having a cut-away central portion terminating in an opening at each end thereof, and a retainer adapted to lie flat in said cut-away portion and having tongues adapted to engage said openings to retain the retainer in said plunger, said retainer having a laterally extending ear to retain the plunger in said housing.

3. In a lock mechanism, a lock cylinder housing having a bore adapted to receive a lock cylinder, a plunger movable transversely in said housing by said lock cylinder, and a retainer adapted to be permanently assembled in said plunger to retain said plunger assembled in said housing, said retainer having a lug for limiting the swing of the lock cylinder.

4. In a lock mechanism, a lock cylinder housing having a bore adapted to receive a lock cylinder, said housing having a side outlet, a locking bolt insertable through said outlet to extend transversely of said bore, a spring within said bore tending to project said bolt through said outlet, a stop attachment for said bolt applied thereto after insertion of said bolt through said outlet to thereafter limit the outward movement of said bolt, and a lock cylinder in said bore cooperable with said bolt to effect projection or retraction thereof relative to said outlet.

5. In a lock mechanism, a lock cylinder housing having a bore adapted to receive a lock cylinder, said housing having a side outlet, a locking bolt insertable through said outlet to extend transversely of said bore, a spring within said bore tending to project said bolt through said outlet, a stop attachment for said bolt applied thereto after insertion of said bolt through said outlet to thereafter limit the outward movement of said bolt, and a lock cylinder in said bore cooperable with said bolt to effect projection or retraction thereof relative to said outlet, there being a projection on said attachment for limiting the movement of said lock cylinder.

6. In a lock mechanism, a lock cylinder housing having a bore adapted to receive a lock cylinder, a lock bolt movable transversely in said housing and having a transverse notch, a cam operable by the lock cylinder to engage in said notch to control the shifting movement of said bolt into locking or unlocking position, and a retainer member seated in said notch and adapted to engage the housing wall to limit the movement of said bolt.

7. In a lock mechanism, a lock cylinder housing having a bore adapted to receive a lock cylinder, a lock bolt movable transversely in said housing and having a transverse notch, a cam operable by the lock cylinder to engage in said notch to control the shifting movement of said bolt into locking or unlocking position, and a retainer member seated in said notch and adapted to engage the housing wall to limit the movement of said bolt, said retainer member having an extension for limiting the movement of said lock cylinder.

In testimony whereof, I have hereunto set my hand and affixed my seal this 25th day of March, 1930.

ERNEST J. VAN SICKEL.